United States Patent [19]

Saito

[11] Patent Number: 5,160,864
[45] Date of Patent: Nov. 3, 1992

[54] OIL-COOLED ALTERNATOR

[75] Inventor: Akihiro Saito, Katsuta, Japan

[73] Assignee: Hitachi, Ltd., Tokyo, Japan

[21] Appl. No.: 330,765

[22] Filed: Mar. 30, 1989

[30] Foreign Application Priority Data

Apr. 1, 1988 [JP] Japan .................. 63-78144

[51] Int. Cl.⁵ .............................. H02K 9/20
[52] U.S. Cl. ....................... 310/54; 310/59; 310/60 A; 310/68 D; 310/263
[58] Field of Search ............ 310/263, 57, 68 D, 61, 310/54, 60 A, 58, 62, 59, 63, 60 R, 105, 89, 254, 112, 266; 29/596

[56] References Cited

U.S. PATENT DOCUMENTS

| | | | |
|---|---|---|---|
| 3,078,409 | 2/1963 | Bertsche, Jr. | 310/68 D |
| 3,089,045 | 5/1963 | Derks | 310/54 |
| 3,480,810 | 11/1969 | Potter | 310/54 |
| 3,558,943 | 1/1971 | Nilsson | 310/58 |
| 4,221,982 | 9/1980 | Raver | 310/59 |
| 4,496,862 | 1/1985 | Weber | 310/54 |
| 4,739,204 | 4/1988 | Kitamura | 310/68 D |
| 4,818,906 | 4/1989 | Kitamura | 310/68 D |

FOREIGN PATENT DOCUMENTS

| | | |
|---|---|---|
| 1084364 | 6/1960 | Fed. Rep. of Germany . |
| 2828473 | 1/1980 | Fed. Rep. of Germany . |
| 0225146 | 10/1987 | Japan . |

OTHER PUBLICATIONS

EMA, H. 1/2, S. 42, Feb. 1961.

Primary Examiner—R. Skudy
Attorney, Agent, or Firm—Antonelli, Terry, Stout & Kraus

[57] ABSTRACT

Cooling of an alternator driven by an internal combustion engine wherein a field core of the alternator is composed of claw-type magnet poles and a cylindrical core such that an oil passage is formed in the regions where the cylindrical core and the rotor shaft oppose each other and where the cylindrical core and the claw-type magnetic poles oppose each other. The oil passage is communicated at its one end with an oil source outside the alternator so as to introduce an oil into the oil passage during operation of the alternator so that a centrifugal force is applied to the oil by the rotation of the rotary field core thereby spraying the oil in the form of vapor or mist onto the stator coil.

12 Claims, 2 Drawing Sheets

OIL-COOLED ALTERNATOR

BACKGROUND OF THE INVENTION

The present invention relates to an oil-cooled alternator and a method of cooling an alternator driven by an internal combustion engine.

Alternators driven by an internal combustion engine of, for example, an automobile or a small ship are usually cooled by a flow of air generated by a cooling fan, and in, for example, Japanese Patent unexamined publication no. 62-225,146, a alternator is proposed wherein liquid-cooled cooling water circulated in an internal combustion engine is employed to cool the alternator.

Cooling by air, however, is disadvantageous in that the size of the alternator to be cooled becomes large and in that noise is generated by the flow of air. Cooling by the cooling water also is undesirable because the rotary part of the alternator encounters a greater resistance and the weight of the whole system is inconveniently increased.

Recently, a cooling system has been proposed in which a cooling liquid passage is formed in the rotor shaft so that a cooling liquid is distributed by the centrifugal force so as to cool, for example, the stator core of an alternator. This method, however, requires a complicated machining for forming the liquid passage and, in addition, the cooling effect is liable to be impaired by, for example, clogging of the liquid passage.

SUMMARY OF THE INVENTION

Accordingly, an object of the present invention is to a method of cooling a cooled alternator and the alternator in which heated parts of the alternator such as a stator coil, field coil and so on are effectively and directly cooled by an oil distributed through an oil passage which is easy to machine, thereby attaining a higher output power of the alternator while allowing the size and weight of the alternator to be reduced.

To these ends, according to one aspect of the present invention, includes a rotor shaft rotatably supported within brackets through bearings and adapted to be driven by an internal combustion engine, a rotary field core fixed to the rotor shaft and adapted to be excited by a field coil, and a stator core stationarily fixed to the inner peripheral surfaces of the brackets and carrying a stator coil.

In accordance with the method of the present invention, the rotary field core composed of claw-type magnet poles and a cylindrical core such that an oil passage means is formed in the regions where the cylindrical core and the rotor shaft oppose each other and where the cylindrical core 8 and the claw-type magnetic poles oppose each other, with the oil passage means being allowed to communicate at one end thereof with an oil source outside the alternator so as to introduce an oil into the oil passage means during operation of the alternator so that a centrifugal force is applied to the oil by the rotation of the rotary field core thereby spraying the oil in the form of vapor or mist onto the stator coil. The sprayed oil is collected at the bottom of the brackets and returned to the oil source through an oil outlet formed in the bracket, with the oil being allowed to recirculate through the circuit thereby cooling the alternator.

According to another aspect of the invention, an oil-cooled alternator driven by an internal combustion engine includes oil inlet means provided in the bracket means for allowing oil from oil source means outside the alternator into the interior of the bracket means with the oil passage means being provided in or on the rotary field core and having an inlet end communicated with the oil inlet through an oil passage space formed inside the bracket means, while the outlet end of the passage means is opened towards the stator coil. An oil outlet means is provided in the bottom of the bracket means for allowing the oil collected in the bracket means to return to the oil source means.

By virtue of the oil cooling method of the present invention, the oil is directly sprayed and atomized onto the stator core and portions thereround by the force produced by the oil pressure and the centrifugal force generated as a result of rotation of the rotary field coil, thereby cooling the stator core. Some fractions of the sprayed oil, which have failed to reach the stator coil or which drip from the stator coil, attach also to the field coil thereby cooling the field coil. The oil then flows down into the bottom of the bracket and is returned to the oil source through the oil discharge port.

Thus, the oil is recirculated to directly absorb the heat from the stator coil and the field coil during the operation of the alternator, thereby effectively cooling the alternator. It will be seen that this direct cooling system does not cause any problem with regard to insulation and corrosion because the oil is electrically insulating and is not corrosive. Cooling of the rectifier may be effected by, for example, installing the rectifier on the outer side of the bracket and arranging a portion of the oil passage in this bracket.

Since the stator coil and the field coil are cooled by the mist of the sprayed oil, the driving of the rotary magnetic poles encounters a reduced resistance as compared with the case where the cooling is effected by an oil in liquid phase. In addition, an effective cooling is done with a reduced flow velocity of the oil. The cooling oil passage in the rotary field core is simple and does not substantially increase the space factor of the alternator, so that the size and weight of the alternator can advantageously be reduced.

BRIEF SUMMARY OF THE INVENTION

DESCRIPTION OF THE PREFERRED EMBODIMENT

Figure 1:
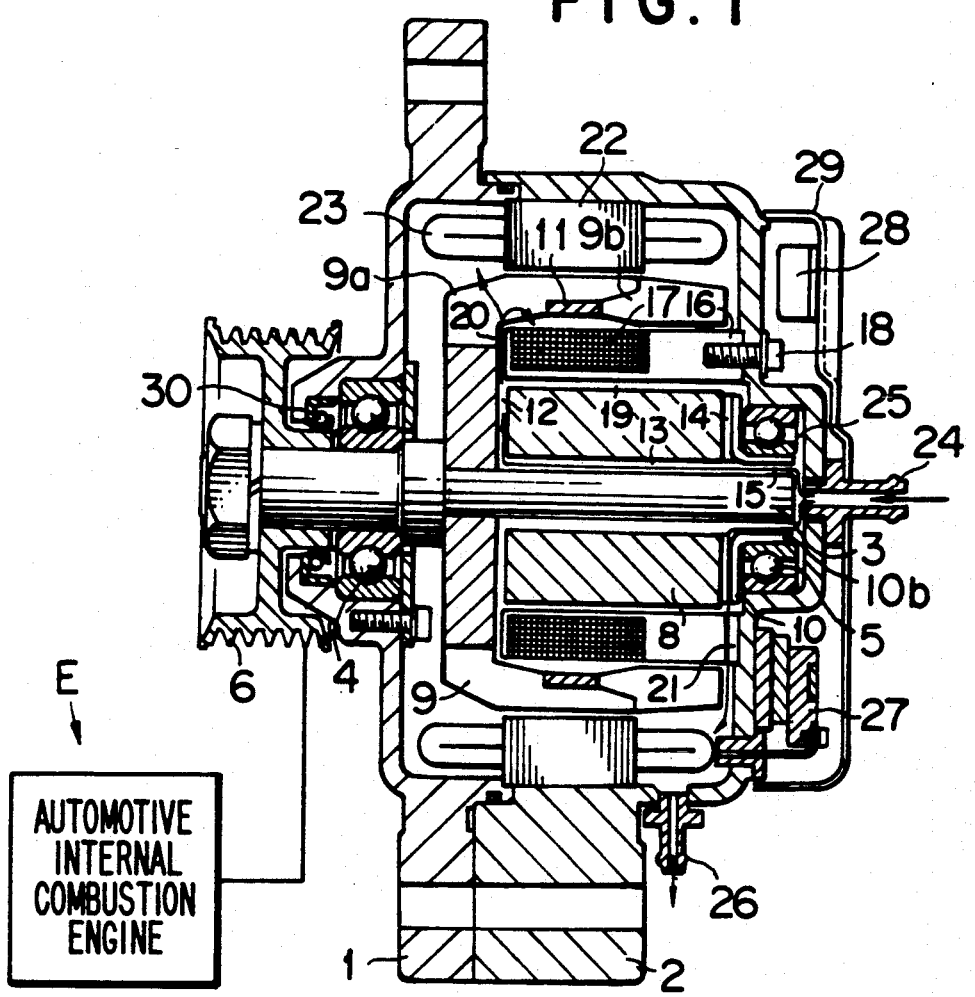
FIG. 1 is a longitudinal cross-sectional view of an automotive brushless oil cooled alternator constructed in accordance with the present invention and adapted to be driven by an automotive engine.

As shown in FIG. 7, alternator has a front bracket 1, a rear bracket 2 and a rotor shaft 3 with the rotor shaft 3 being rotatably supported by bearings 4 and 5 disposed in the front and rear brackets 1 and 2. The rotor shaft 3 has one end which extends outwardly through the front bracket 1, with a belt pulley 6 to which the power is transmitted from the automotive engine generally designated by the reference character E being fixed to the outwardly extending end of the rotor shaft 3. The alternator also has an induction type rotary field core 7 fixed to the rotor shaft 3, with the rotary field core 7 having a cylindrical core 8, a claw-type magnetic poles 9 and a collar member 10.

The claw-type magnetic poles include a pair of magnet poles 9a and 9b coupled to each other through a non-magnetic fixing member. The poles 9 are fixed to the front end surface of the cylindrical core 8. The collar member 10 is fixed to the rear end surface of the cylindrical core 8.

Figure 2:
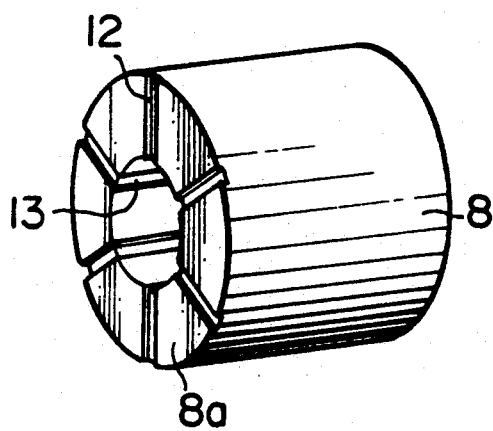
FIGS. 2 and 3 are perspective views of components of a rotary field core used in the embodiment shown in FIG. 1.

As shown in FIG. 2, the cylindrical core 8 includes six slots 12 are radially and equidistantly formed in the front end surface 8a, with the slots 12 being located at positions corresponding to the portions intermediate the claw-type poles 9, i.e., bases of the claws. Axial grooves 13 are formed in the inner peripheral surface of the cylindrical core 8 in communication with the slots 12.

Figure 3:
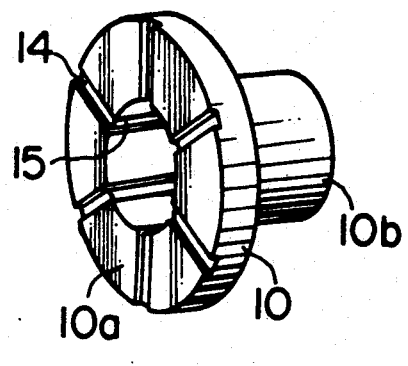

As shown in FIG. 3, the collar member 10 includes six radial slots 14 formed in the end surface 10a where the collar member 10 is bonded to the cylindrical core 8. The collar member 10 has a boss 10b for receiving the rotor shaft 3. Axial grooves 15 are formed in the inner peripheral surface of the boss 10b in communication with the slots 14. Thus, the grooves 15 and 13 provide oil passages which extend along the outer periphery of the rotor shaft 3. The slots 12 provide oil passages between the front end surface of the cylindrical core 8 and the inner side of the magnetic pole 9a, while the slots 14 provide oil passages between the rear end surface of the cylindrical core 8 and the collar member 10. The bearing 5 is arranged around the boss 10b of the collar member 10 and rotatably supports one end of the rotary field core 7 and the rotor shaft 3.

A field yoke 16 with a field coil 17 wound thereon is interposed between the inner periphery of the claw-type poles 9 and the outer periphery of the cylindrical core 8, with its one end fixed to the inner surface of the bracket 2 by screws 18. A minute gap 19 formed between the inner periphery of the field yoke 16 and the outer periphery of the cylindrical core 8 communicates at its one end with slots 14 and at its other end with slots 12. A small gap 20 also is formed between the front end surface of the field yoke 16 and the inner side of the claw-type pole 9a. The gap 20 forms a continuous oil passage together with the minute gap 19 and the slots 12, with one open end being directed towards a stator coil 23 which will be described later.

A minute gap 21 also is formed between the rear end surface of the field yoke 16 and the inner surface of the rear bracket 2. The minute gap 21 communicates with the slots 14 with its one end opening directed towards the stator coil 23.

The stator coil 23 is wound on a stator core 22 which is stationed on the inner side of the brackets 1 and 2 in a manner surrounding the rotary field core 7.

An oil inlet 24 in the form of a nipple is provided on a portion of the rear bracket 2 near the bearing 5, with the oil inlet 24 communicating at one end with an oil passage space 25 formed between the bearing 5 and the inner side of the rear bracket 2. The oil passage space 25 communicates with the grooves 15. The other end of the oil inlet 24 communicates with a lubricating oil storage portion (oil reservoir) of the automotive engine through a tube and an oil pump which are not shown.

Oil outlets in the form of nipples are secured to bottoms of the brackets 1 and 2 with the oil outlets 26 being in communication with the oil reservoir through tubes (not shown).

The alternator has a full-wave rectifier 27 which is fixed to the outer surface of the bracket 2 include contact therewith, at a location corresponding to the aforementioned minute gap 21. A voltage regulator 28 is fixed to a cover 29, and an oil seal 30 at the bracket 7.

As the rotor shaft 3 is rotated by the power of the engine, the induction type rotary field core 7 rotates. As the field coil 17 is excited in this state, an AC output is generated in the stator cord 23, with the AC output being rectified by the rectifier 27 and, after a voltage regulation through the voltage regulator 28, supplied to a battery (not shown) and electric load (not shown).

During the operation of the alternator, the engine lubricating oil is supplied by the oil pump (not shown) to the oil inlet 24, with the oil then flowing in the direction of the arrows through the oil passage space 25 and the grooves in the rotary field core 7. The oil then shunts into two portions: namely, a portion which is introduced into the grooves 13 and then the slots 12 and a portion which is introduced into the minute gap 19 through the slots 14. These two portions then merge in each other as they reach the minute gap 20. A portion of the oil reaching the slots 14 flows into the minute gap 21.

The oil passing through the oil passages is sprayed in the form of vapor or mist onto front and rear portions of the stator coil 23 by the centrifugal force generated as a result of rotation of the rotary field core 7, whereby the stator coil 23 is cooled by the sprayed oil. Meanwhile, a fraction of oil which could not reach the stator coil 23 and a fraction of the oil which has dripped from the stator coil 23 attach to the field coil 17 thereby cooling the same. The field coil 17 is cooled also indirectly by the oil which flows through the minute gap 19 formed between the inner peripheral surface of the field yoke 16 and the outer peripheral surface of the core 8. The rectifier 27 also is cooled indirectly across the bracket wall by the oil which flows through the minute gap 21. Then, the oil flows along the inner surface of the bracket and other portions and then flows down into the bottom of the bracket by the force of gravity. The oil then returns to the lubricating oil reservoir through the oil outlet 26. It will be seen that the oil serves also to lubricate the bearings 4 and 5.

In the illustrated embodiment, the oil is recirculated through the described circuit so that the heat-generating parts such as the stator coil 23, the field coil 17, the rectifier 27 and so forth are effectively cooled. In particular, the stator coil 23 and the field coil 17 are highly effectively cooled by virtue of the direct spray of the oil vapor thereto, whereby the output characteristic of the alternator can be remarkably improved. In addition, the cooling means can simply and easily be formed by slots, grooves and minute gaps formed in or on the rotary field core, so that the size and the weight of the alternator can be reduced. Furthermore, since the described alternator can have a hermetic construction free from invasion by external foreign matters such as dust and water, it can suitably be used as alternators on vehicles such as automobiles, small vessels and so forth.

Figure 4:
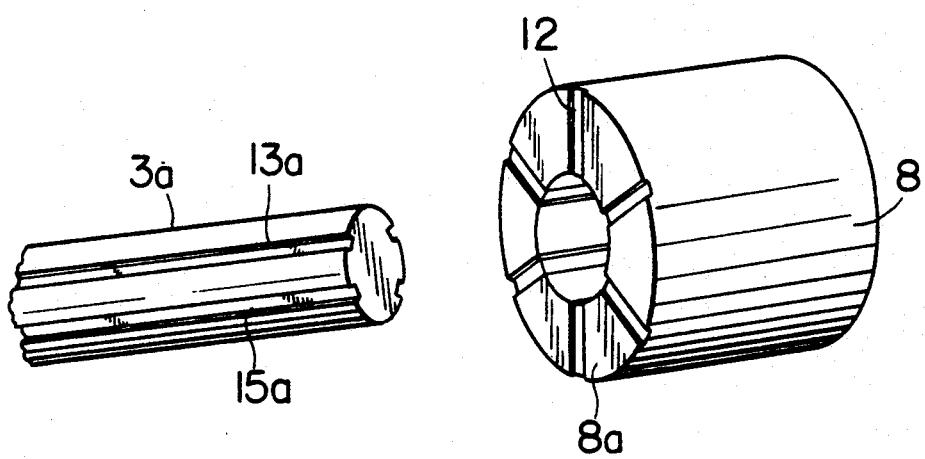
FIG. 4 is a perspective exploded view of an alternate embodiment of an alternator constructed in accordance with the present invention and adapted to be driven by an automotive engine.

Although a preferred embodiment of the present invention has been described, it is to be understood that the described embodiment is only illustrative. For example, as shown in FIG. 4, a rotor shaft 3a may be provided which includes grooves 13a, 15a, respectively corresponding to grooves 13 and 15, formed in the surface of the rotor shaft 3a rather than on the stationary side of the alternator, and the cooling means constituted by the slots 12,14, grooves 13,15 and minute gaps 19, 20 and 21 can be applied not only alternators for use on vehicles but also to various other alternators. Further changes and modifications may be imparted thereto without departing from the scope of the invention which is limited solely by the appended claims.

What is claimed is:

1. A oil-cooled alternator comprising:
a rotor shaft rotatably supported within bracket means through bearings and adapted to be driven by an internal combustion engine;
a rotary field core fixed to said rotor shaft and adapted to be excited by a field coil;
a stator core stationarily fixed to inner peripheral surfaces of said bracket means and carrying a stator coil;
oil inlet means provided in said bracket means for allowing oil from oil source means outside said alternator into an interior of said bracket means;
oil passage means provided at said rotary field core and having an inlet end communicating with said oil inlet means through an oil passage formed inside said bracket means, while an outlet end of said oil passage means is opened towards said stator coil;
an oil outlet means provided in a bottom of said bracket means for allowing oil collected in said bracket means to return to said oil source means; and
wherein the oil passage means includes axially extending grooves formed in one of the rotor shaft and a surface of a cylindrical core of the rotor field core facing the rotor shaft.

2. An alternator according to claim 1, further comprising a rectifier fixed to an outer surface of one end portion of said bracket means in close contact therewith, wherein said oil passage means has a portion formed between an inner peripheral surface of said bracket means and one end surface of said rotary field core at a position corresponding to a position where said rectifier is fixed to an outer surface of the one end portion of said bracket means.

3. An oil-cooled alternator according to one of claims 1 or 2, wherein said alternator is a brushless type alternator including a field yoke carrying said field coil stationarily fixed between claw-type magnetic poles and the cylindrical core, said oil passage means including a first portion extending along an inner peripheral surface of said cylindrical core and a second portion extending along a gap between an outer peripheral surface of said cylindrical core and an inner peripheral surface of said field core, said first and second portions of said oil passage means being then merged in each other, and wherein said oil passage means open towards a front portion of said stator coil and towards a rear portion of said stator core.

4. An alternator according to claim 3, wherein said internal combustion engine is an automotive engine, and said oil is lubricating oil in said automotive engine.

5. An oil-cooled alternator according to claim 1, wherein said oil passage means are provided in said rotary field core.

6. An oil-cooled alternator according to claim 5, wherein said alternator is a brushless type alternator including a field yoke carrying said field coil stationarily fixed between claw type magnetic holes and the cylindrical core, said oil passage means including a first portion extending along an inner peripheral surface of said cylindrical core and a second portion extending along a gap between an outer peripheral surface of said cylindrical core and an inner peripheral surface of said field core, said first and second portions of said oil passage means being then merged in each other, and wherein said oil passage means open towards a front portion of said stator coil and towards a rear portion of said stator core.

7. An oil-cooled alternator comprising:
a rotor shaft;
a rotary field core fixed to said rotor shaft and adapted to be excited by a field coil;
a stator core carrying a stator coil;
oil inlet means provided in a bracket means rotatably supporting said rotor shaft for allowing oil from an oil source to be supplied to said alternator;
oil passage means provided at said rotary field core and having an inlet end communicating with said oil inlet means through an oil passage space and an outlet end opening towards said stator coil, said oil passage means being arranged such that a centrifugal force is applied to the oil by a rotation of said rotary field core thereby spraying said oil in the form of a vapor and mist onto said stator coil;
oil outlet means for allowing collected sprayed oil to be returned said oil source; and
wherein the oil passage means includes axially extending grooves formed in one of the rotor shaft and a surface of a cylindrical core of the rotary field core facing the rotor shaft.

8. An oil-cooled alternator comprising:
a rotor shaft rotatably supported within bracket means through bearings and adapted to be driven by an internal combustion engine;
a rotary field core fixed to said rotor shaft and adapted to be excited by a field coil;
a stator core stationarily fixed to inner peripheral surfaces of said bracket means and carrying a stator coil;
oil inlet means provided in said bracket means for allowing oil from oil source means outside said alternator into an interior of said bracket means;
oil passage means provided at said rotary field core and having an inlet end communicating with said oil inlet means through an oil passage formed inside said bracket means, while an outlet end of said oil passage means is opened towards said stator coil;
an oil outlet means provided in a bottom of said bracket means for allowing oil collected in said bracket means to return to said oil source means;
wherein the oil passage means includes axially extending grooves formed in one of the rotor shaft and a surface of a cylindrical core of the rotary field core facing the rotor shaft, and
wherein the oil passage means further includes radially extending grooves in an end surface of the cylindrical core in communication with the axially extending grooves.

9. An oil-cooled alternator according to one of claims 1 or 7, wherein said axially extending grooves are circumferentially spaced and are formed in an inner peripheral surface of said rotary field core, and said oil passage means further includes a plurality of radially extending slots formed in an end face of said rotor field core respectively communicating with said axially extending grooves.

10. An oil-cooled alternator according to one of claims 1 or 7, wherein a collar is bonded to said rotary field core, said collar including a boss for receiving the rotor shaft, and wherein said oil passage means further includes a plurality of radial slots formed in an end surface of said collar in communication with a plurality of axially extending grooves formed in an inner peripheral surface of the boss whereby said oil passage means extend along an outer periphery of the rotor shaft.

11. An oil-cooled alternator according to one of claims 1 or 7, wherein said oil passage means are provided at least in an area where the rotor shaft and rotary field core are disposed in opposition to each other.

12. An oil-cooled alternator comprising:
a rotor shaft;
a rotary field core fixed to said rotor shaft and adapted to be excited by a field coil;
a stator core carrying a stator coil;
oil inlet means provided in a bracket means rotatably supporting said rotor shaft for allowing oil from an oil source to be supplied to said alternator;
oil passage means provided at said rotary field core and having an inlet end communicating with said oil inlet means through an oil passage space and an outlet end opening towards said stator coil, said oil passage means being arranged such that a centrifugal force is applied to the oil by a rotation of said rotary field core thereby spraying said oil in a form of a vapor and mist onto said stator coil;
oil outlet means for allowing collected sprayed oil to be returned to said oil source,
wherein the oil passage means includes axially extending grooves formed in one of the rotor shaft in a surface of a cylindrical core facing the rotor shaft, and
wherein the oil passage means further includes radially extending grooves in an end surface of the cylindrical core in communication wit the axially extending grooves.

* * * * *